United States Patent Office 2,783,231
Patented Feb. 26, 1957

2,783,231
SALTS OF NEW HARDENABLE, BASIC, TERNARY CONDENSATION PRODUCTS

Otto Albrecht, Neuewelt, near Basel, and Armin Hiestand, Basel, Switzerland, assignors to Ciba Limited, Basel, Switzerland, a Swiss firm No Drawing. Application August 14, 1952,
Serial No. 304,442

Claims priority, application Switzerland August 31, 1951

6 Claims. (Cl. 260—249.6)

This invention relates to the manufacture and application of salts of new hardenable, basic, ternary condensation products.

The invention is based on the observation that water soluble salts, including quaternary ammonium salts of new, hardenable, basic ternary condensation products are obtained when there are reacted together in any sequence (a) methylol compounds of aminotriazines or urea or their ethers with low molecular alcohols, (b) aliphatic compounds which contain a carbon chain of at least 7 C-atoms and a reactive hydrogen atom attached to a hetero-atom and (c) primary or secondary amines or water soluble salts thereof or such tertiary amines as contain in the molecule a reactive hydrogen atom attached to another hetero-atom, i. e. to an oxygen atom, a sulfur atom or another, non-basic, nitrogen atom, and the resultant bases are then converted into water soluble salts including quaternary ammonium salts, unless salts of primary or secondary amines have been used.

The process can be carried out in such a manner that first the compounds specified under (a) are condensed with the compounds as specified under (b) and the condensation product thus obtained reacted with the compounds as specified under (c), or that first the components specified under (a) and (c) are combined and the product obtained reacted with the compounds specified under (b), or further that first the compounds specified under (b) and (c) are condensed together and the condensation product thereupon reacted with the compounds as specified under (a). Finally the possibility is also provided of reacting all three components together simultaneously.

As methylol compounds of amino triazines which may be used as reaction components corresponding to (a) there are primarily concerned the reaction products of formaldehyde with 2:4:6-triamino-1:3:5-triazine, usually known as melamine. Such condensation products can contain from 1 to 6 methylol groups and they usually constitute mixtures of different compounds. Furthermore, methylol compounds are concerned of such derivatives of melamine as still contain at least one amino group, for example methylol compounds of melam, melem, ammeline, ammelide or of halogen substituted aminotriazines, such as 2-chloro-4:6-diamino-1:3:5-triazine; moreover methylol compounds of guanamines, as for example of benzoguanamine, acetoguanamine or formoguanamine. The ethers of the methylolaminotriazines with low molecular alcohols, which are applicable, can be derived from the compounds just mentioned on the one hand and from aliphatic alcohols on the other hand, for example from methyl alcohol or butyl alcohol. There may be mentioned, for example, the methyl ethers of methylolmelamines with 4 to 6 methylol groups in which 2 to 6 methylol groups are etherified. Such ethers can be obtained, for example, by heating of the methylol melamines with the alcohols in the presence of small quantities of mineral acids in the conventional manner. As methylol compounds of urea or ethers thereof, which can be used as reaction components according to (a), there may be mentioned dimethylol urea and dimethylol urea methyl ether.

Among the aliphatic compounds which contain a carbon chain of at least 7 C-atoms and which can be used as reaction components corresponding to (b), such are primarily concerned as contain the reactive hydrogen atom attached to an oxygen atom, a sulfur atom or a non-basic nitrogen atom. The compounds with a non-basic nitrogen atom are amide-like compounds; there may be mentioned, for example, amides from ammonia or from primary amines, such as methyl-, ethyl-, dodecyl-, octadecyl- or cyclohexylamine on the one hand and from carboxylic acids, such as acetic, chloracetic, butyric, capric, lauric, stearic, behenic or oleic acid on the other hand; furthermore substituted ureas, such as monododecylurea; also urethanes, as are obtainable, for example, from the chloroformic acid esters of higher molecular alcohols with ammonia or primary amines, such as octadecylurethane; moreover secondary amides, such as dilauric amide or N:N'-diacylated alkylene or arylene diamines, for example methylene distearic amide.

As compounds which contain a reactive hydrogen atom attached to a sulfur atom, mercaptans, such as dodecyl or octadecyl mercaptan, may be mentioned and further esters of higher molecular alcohols with mercapto carboxylic acids, such as esters of thioglycollic acid.

As compounds which contain a reactive hydrogen atom attached to an oxygen atom there are concerned carboxylic acids, alcohols and N-methylol compounds. Among the carboxylic acids which contain a carbon chain of at least 7 C-atoms there may be mentioned capric, lauric, stearic, behenic, oleic, ricinoleic or montanic acid. As alcohols primary, secondary or tertiary alcohols may be used which may have straight or branched chains, as for example lauric alcohol, cetyl alcohol, octadecyl alcohol, and 2-butyloctanol.

The N-methylol compounds which can be used for the present process are preferably N-methylol compounds of amides or amide-like compounds such as have been described above.

Among the specified compounds which can be used as reaction components corresponding to (b) preferably such are used as contain at least one carbon chain of 16–18 C-atoms, especially derivatives of stearic acid, of octadecyl alcohol or of octadecylamine.

The primary or secondary amines themselves or water soluble salts thereof which are concerned as reaction components corresponding to (c) may belong to the aromatic, hydroaromatic, araliphatic, heterocyclic or preferably to the aliphatic series. As aliphatic amines there are suitably used for the reaction alkylamines, dialkylamines, hydroxyalkylamines, bis-(hydroxyalkyl)-amines and N':N'-dialkylalkylene diamines. Both straight chain and also branched chain, saturated and unsaturated representatives among these compounds, with, for example, 1–18 C-atoms can be used. Of these compounds those with carbon chains of 1–4 C-atoms are especially suitable. There may be mentioned, for example, methylamine, ethylamine, propylamine, isopropylamine, butylamine, isobutylamine, allylamine, mono- and diethanolamine, propanolamine, di-isobutylamine, N':N'-diethylethylenediamine and diethylenetriamine. Aliphatic amines which are substituted in the alkyl radical are, however, also concerned, such as aminocarboxylic acids or sulfonic acids, for example alanine or taurine.

Among the hydroaromatic amines, cyclohexylamine, dicyclohexylamine and N-methyl-cyclohexylamine may be mentioned by way of example.

The araliphatic amines are preferably derived from benzylamine; benzylamine itself may be mentioned and also its derivatives substituted in the nucleus, for example by halogen, alkyl or alkoxy groups.

The aromatic amines may be mono- or poly-nuclear and may, if desired, be further substituted. Aniline and its nuclear substitution products, as for example o- and p-toluidine, various chloranilines, o- and p-anisidine, are preferably used. However, naphthylamines, such as α- and β-naphthylamine and their nuclear substitution products, can also be used for the reaction according to the invention.

The heterocyclic amines which are applicable can contain one or more hetero-atoms. The following may be mentioned: Piperidine, α-pipecoline, morpholine, pyrrolidine, imidazole, benzimidazole, 2-aminothiazole, 5-aminotetrazole and tetrahydroquinoline. As salts of the primary or secondary amines there can advantageously be used those with the usual organic or inorganic acids.

The tertiary amines which contain a reactive hydrogen atom attached to another hetero-atom, i. e. to an oxygen atom, a sulfur atom or another, non-basic, nitrogen atom, which can likewise be used as components corresponding to (c), preferably belong to the aliphatic series. Tertiary alkanolamines are concerned, such as triethanolamine, diethyl-ethanolamine and tripropanolamine, β-oxyethylmorpholine and also condensation products of such alkanolamines with polyglycols or alkylene oxides, furthermore partial esters of such alkanolamines with carboxylic acids, such as triethanolamine stearic acid mono-esters and ether-like reaction products of alkanolamines with N-methylolamides, for example the reaction products of 1 mol of triethanolamine with 1 or 2 mols of stearic acid-N-methylolamide. The compounds which contain, together with the tertiary nitrogen atom, another, non-basic, nitrogen atom are primarily derived from aliphatic polyamines which contain together with at least one tertiary amino group also a primary amino group which is acylated. Such a compound is, for example, N':N'-diethylethylene-diamine acylated with stearic acid.

Instead of the application of individual compounds which are set forth as reaction components under (a), (b) and (c) for the present process, obviously mixtures of several of such compounds can also be used.

The manufacture of the new ternary condensation products takes place, in part, by the application of conventional processes, namely those which are known for the synthesis of the binary intermediate products. The production of condensation products from the components a and b may be illustrated by the reaction of methylolaminotriazines, or their ethers derived from low molecular alcohols, and N-methylolamides of carboxylic acids. The starting materials can, for example, be heated to 50-100° C. in the presence of condensing agents such as boric acid, in which operation it is advantageous to remove the volatile hydroxyl compound (water or low molecular alcohols), produced in the reaction, from the reaction mixture by the application of reduced pressure. If in this reaction aminotriazine derivatives with free methylol groups are used as starting materials, it is still more advantageous to have present in the reaction an auxiliary solvent, such as benzene or toluene, which renders it possible to remove the water of reaction continuously from the reaction mixture in the form of an azeotropic mixture. The proceeding can, for example, be such that the reaction is carried out at the boiling point of the auxiliary solvent and the distillate condensing in the reflux condenser, prior to return to the reaction vessel, is passed through a water separator which retains the water which has been split off. In a similar manner, instead of the N-methylolamides, the reaction can be carried out with the carboxylic acids, carboxylic acid amides and alcohols which are concerned as reaction components corresponding to (b).

The reaction of intermediate products thus produced with the reaction component c, that is to say the amines, likewise takes place with advantage at elevated temperatures, preferably at temperatures above 100° C., for example at 120-150° C. The reacting compounds can simply be fused together or reacted in the presence of an inert organic solvent. It may be of advantage to carry out the reaction under reduced pressure, whereby the easily volatile products produced, such as water and low molecular alcohols, can be removed from the reaction mixture. When easily volatile amines, as for example dimethylamine, ethylamine or morpholine are used for the reaction, it is of advantage to operate at ordinary pressure or even at elevated pressure in a closed vessel.

The operations are similar when first the reaction components a and c are reacted together and the intermediate product produced is condensed with the component b, or when first a condensation product is produced from the compounds corresponding to (b) and (c) and this is further condensed with the component a, or when all three components are reacted together simultaneously.

The molecular ratio between the components which are used is primarily dependent upon the number of the methylol or methylol ether groups in the component a. Advantageously for one mol of a compound corresponding to (a) 1-2 mols of a compound corresponding to (b) and 1 mol of a compound corresponding to (c) are used for the reaction.

The new products obtainable by the reaction sequences above set forth constitute wax-like substances which as such are insoluble in water but in the form of salts are water-soluble.

The conversion of the free bases into the water-soluble salts, including quaternary ammonium salts which follows the condensation, except when salts of primary or secondary amines are used, is conducted by per se conventional methods. For the salt formation, inorganic or organic acids can be used. There are used advantageously low molecular carboxylic acids such as propionic acid, glycollic acid, formic acid and especially acetic acid. It is also possible to convert the ternary condensation products, insofar as they contain a secondary amino group, by alkylation or aralkylation into water-soluble salts of tertiary amines, or to convert condensation products with a tertiary amino group into the quaternary ammonium salt. For this conversion dimethylsulfate or benzyl chloride is suitable for example.

The water-soluble salts obtainable according to the present invention, when prepared from suitable starting materials, can be used, among other purposes, as auxiliary substances, for example in the textile, leather and paper industries. They can be applied as agents for rendering materials water-repellent and also as agents which reduce creasing or shrinking during washing and especially as softening agents. Upon wool interesting finishing effects can be attained with suitable products obtainable according to the invention, especially a considerably increased resistance to shrinkage, combined with an agreeable soft handle.

The application of the products obtainable according to the present process can be carried out in such a manner that the materials to be improved, preferably textiles, are treated with solutions, advantageously aqueous solutions of salts of the ternary condensation products, and if desired are heated to elevated temperatures.

For the finishing of wool, the material can be treated, for example, with a 5-10 percent aqueous solution of a salt of a product of the process, dried at low temperature and then heated for some time, for example 2 hours, to 80-90° C. In this manner, with products which contain an aliphatic radical with about 16-18 C-atoms, especially valuable finishes are obtained.

For the finishing of cellulosic materials, such as cotton or artificial silk from regenerated cellulose, the materials, impregnated with aqueous solutions of salts of suitable products of the process, advantageously in the presence of excess of acid such as formic acid, after pressing or squeezing out, can, without intermediate drying, be heated to elevated temperature, for example to 100-150° C. In this method of treatment, products with an aliphatic radical of about 16–18 C-atoms impart to the treated material a water-repellent finish which is to a far-reaching extent resistant to washing. To the baths intended for the production of a water-repellent finish there may be added water-soluble aluminum salts, for example aluminum triformate, or also zirconium compounds, for example zirconium salts or sols of hydrated zirconium dioxide, or paraffin wax dispersions. In a similar manner a soft handle can also be imparted to the textiles. For the preparation of a water-repellent finish in general 10–80 grams per liter of the condensation products are added to the foularding bath, whereas for imparting a soft handle much smaller quantities, for example 0.1 percent of the weight of the fabric, are sufficient.

The products of the present invention can be used alone or, as to some extent already indicated, together with other substances, such as salts, especially of weak acids, for example sodium acetate or aluminum acetate, or also together with hydrocarbons, such as paraffin wax, solvents, methylolamides, protective colloids, finishing or matting agents, such methylolureas, weighting or softening agents and the like, these additions being, however, selected in such a manner that they cause no precipitation of the products of this invention from the solutions of their salts.

The following examples illustrate the invention, the parts being by weight unless otherwise stated and the relation between part by weight and part by volume being the same as that between the kilogram and the liter:

*Example 1*

A mixture of 15 parts of triethanolamine and 90 parts of a fused ester from methylated methylolmelamine and stearic acid, the preparation of which is described below, is heated with stirring, under reduced pressure (10–20 mm.) to 115–120° C. until a test portion removed from the reaction vessel is soluble in dilute hot acetic acid. Thereupon the melt is stirred at 70–80° C. with 7 parts of glacial acetic acid. A yellowish, wax-like and water-soluble product is obtained which on stirring with about double the quantity of hot water assumes a paste-like consistency.

The ester from the methylated methylol melamine and the stearic acid is prepared in an analogous manner to the esters described in Swiss Patent No. 251,642. In this process, however, there is used as starting material a methylated methylol melamine which only differs from the methylol melamine methyl ether described in the last paragraph of the example of the said patent by the fact that the syrup which is obtained after condensation, filtration and concentration to about 99 percent, is not taken up in benzene but filtered hot for the removal of the residual salt.

1 part of this methylol melamine methyl ether is heated with about 1.3 parts of stearic acid under a pressure of 10–20 mm. to 180–200° C. until the acid number of the product has fallen to 5–8.

*Example 2*

A similar condensation product to that described in Example 1 is obtained when instead of triethanolamine 10.4 parts of diethylenetriamine are used and the reaction is carried out at a pressure of 40–50 mm.

*Example 3*

By proceeding in an analogous manner to Example 1 but with the use of 11.6 parts of N′:N′-diethyl-ethylene diamine, in the case of which a pressure of 640 mm. is used, a soft, light yellow, wax-like mass is obtained which dissolves in hot water.

When 98 parts of the basic condensation product obtainable according to the preceding paragraph, and not neutralized with acetic acid, are stirred at 40–45° C. with 13 parts of freshly distilled dimethyl sulfate, a wax-like product is obtained which is soluble in water.

When 98 parts of the basic condensation product obtainable according to paragraph 1 and not neutralized with acetic acid, are stirred at 90–95° C. for 4 hours with 13 parts of benzyl chloride, a product is obtained which is soluble in hot water forming opalescent solutions.

*Example 4*

A mixture of 15 parts of triethanolamine and 90 parts of a fused condensation product from methylated methylol melamine and N-methylol stearic acid amide, the preparation of which is described below, is heated with stirring at a reduced pressure of 10–20 mm. for one hour to 115–120° C. The product thus obtained, which dissolves in hot dilute acetic acid, is treated at 90° C. with 7 parts of glacial acetic acid and the mixture well stirred for one hour. After allowing to cool, a wax-like, water-soluble mass is obtained.

The condensation product from the methylated methylol melamine and the N-methylol stearic acid amide, is prepared by heating a mixture of 60 parts of N-methylol stearic acid amide and 39 parts of the methylol melamine methyl ether described in Example 1, to 115–120° C. for 1–2 hours at a pressure of 10–20 mm. A hard wax-like mass is obtained, giving a clear melt with paraffin wax but being itself unmelted in a boiling water bath.

*Example 5*

The process is conducted as described in Example 4 but, in an analogous manner to Example 3, the triethanolamine is replaced by 11.6 parts of N′:N′-diethyl ethylene diamine. A light yellow, wax-like mass is obtained which is soluble in hot water.

*Example 6*

15 parts of triethanolamine and 39 parts of the methylol melamine methyl ether mentioned in Example 1, are heated under a pressure of 10–20 mm. for one hour to 115–120° C. Thereupon, at 115–120° C. with stirring, 60 parts of N-methylol-stearic acid amide are introduced in small portions. After the whole is fused together, the pressure in the reaction vessel is reduced to 10–20 mm. and the melt intensively stirred for one to two hours at 115–120° C. Thereupon 7 parts of glacial acetic acid are added at 90–95° C. and the melt stirred for one hour at 80–90° C. under atmospheric pressure. The condensation product obtained possesses properties similar to that produced according to Example 4.

*Example 7*

15 parts of triethanolamine and 90 parts of a condensation product from N-methylol stearic acid amide and an etherification product from hexamethylol melamine and methanol, which product contains about 3 methoxy groups and is produced according to Example 1 of Swiss Patent No. 268,532, are fused together and, when a melt is produced, heated with stirring at a pressure of 10–15 mm. for 3 hours to 115–120° C. A viscous melt is obtained which, after complete solidification, can be pulverised and which is soluble to a clear solution in hot dilute acetic acid.

*Example 8*

27 parts of commercial stearic acid and 36 parts of the highly methylated methylol melamine specified in Example 1 are fused in a reaction vessel and heated under a reduced pressure, initially of 20–50 mm. depending on the degree of foaming, in 2 hours to 190–200° C. After stirring for one hour at this temperature, the whole is allowed to cool to 120° C. and 30 parts of N-methylol stearic acid amide are introduced. After melting of the methylol amide the whole is intensively stirred at 115–120° C. for one hour at a reduced pressure of 10–20 mm. The product, which solidifies on cooling to a wax-like mass, melts in the hot water bath and forms a clear melt in paraffin wax. The condensation product obtained in this manner can be condensed in an analogous manner to that described in Example 1 with, for example, 15 parts of triethanolamine and after conversion of the product into the acetic acid salt a mass is obtained which is soluble in hot water.

*Example 9*

By proceeding exactly as described in Example 4, with the exception that instead of the 60 parts of N-methylolstearic acid amide 68 parts of N-methylol octadecylurethane, prepared from octadecylurethane and formaldehyde by conventional methods, are used, a soft and waxlike mass which is easily soluble in hot water is obtained.

*Example 10*

39 parts of the methylol melamine methyl ether described in Example 1 and 182 parts of a condensation product prepared from 2 mols of commercial stearic acid and 1 mol of diethylene triamine, are heated in a reaction vessel under a reduced pressure of 10–20 mm. for 1½ hours with intensive stirring to 115–120° C. A brittle, pale yellowish colored mass is obtained which forms a clear melt in paraffin wax and which is of very good solubility in hot dilute acetic acid.

When the basic condensation product is melted in the boiling water bath and stirred with 20 parts of glacial acetic acid and then with about twice the quantity of hot water, there is obtained on cooling a paste which can be diluted with hot water.

*Example 11*

Condensation products which possess similar properties to that described in Example 10 can also be obtained by the process of Example 10 when a smaller quantity of the condensation product from 2 mols of stearic acid and 1 mol of diethylene triamine is used, for example 120 parts or only 60 parts.

*Example 12*

A mixture of 60 parts of the condensation product specified in Example 10 from 2 mols of stearic acid and 1 mol of diethylene triamine, and 15 parts of dimethylolurea dimethyl ether, is melted in a reaction vessel and, depending on the degree of foaming the vessel subjected to a reduction of pressure down to 10–20 mm. with simultaneous stirring and heating to 115–120° C. for 30 minutes. The solidified, pulverisable mass is easily soluble in hot dilute acetic acid.

*Example 13*

27 parts of commercial stearic acid and 15 parts of triethanolamine are heated in a current of nitrogen at 180–200° C. until a test portion of the melt forms a clear solution in hot dilute acetic acid. Thereupon 36 parts of the methylol melamine methyl ether specified in Example 1 are added at 120° C. and the reaction mixture stirred for 2 hours under a pressure of 30 mm. at 115–120° C. 30 parts of N-methylol stearic acid amide are then further added and the melt maintained at 115–120° C. under a reduced pressure of 30 mm. until a test portion is entirely soluble in hot dilute acetic acid, which is usually the case after an hour. The melt is now allowed to cool to 90° C. and 6.5 parts of glacial acetic acid added. After thorough stirring for one hour a wax-like mass is obtained which is soluble in hot water.

*Example 14*

30 parts of N-methylol stearic acid amide, 0.5 part of dry, powdered sodium carbonate and 15 parts of triethanolamine are fused together under a reduced pressure of 30 mm. and heated for 2 hours to 110° C. The melt is then soluble in dilute acetic acid. It is mixed with 36 parts of the methylol melamine methyl ether specified in Example 1 and the mixture again heated under reduced pressure to 120° C. After 2 hours a further 30 parts of N-methylol stearic acid amide are added and the stirring continued until a test portion is soluble in dilute acetic acid. When this is the case, the whole is allowed to cool to 90° C. and 6 parts of glacial acetic acid added. After a further hour's stirring at atmospheric pressure, the melt is allowed to solidify to a waxlike mass which is soluble in hot water.

When the basic condensation product, obtained according to the preceding paragraph but not neutralized with acetic acid, is stirred at 70–80° C. with 13 parts of freshly distilled dimethylsulfate, a wax-like mass is obtained which is soluble in warm water of acid or alkaline reaction.

When the basic condensation product, obtained according to the first paragraph of this example but not neutralized with acetic acid, is stirred for 4–6 hours with 13 parts of benzyl chloride at 85–105° C., there is obtained a product which is soluble in hot water.

The quaternary ammonium salts described above can be used as softening agents. The softening effect obtained therewith on viscose rayon is fast to washing when the material treated in the presence of an acid catalyst is subjected, after drying, to a heat treatment at 145° C. for 5 minutes.

*Example 15*

14 parts of N-hydroxyethyl-morpholine and 90 parts of the ester from methylated methylol melamine and stearic acid mentioned in the second paragraph of Example 1 are fused together and the melt heated to 120° C. while stirring under a pressure of 20–30 mm. After 3–4 hours a test portion is soluble in warm dilute acetic acid. The melt is cooled to 60° C. and 13 parts of freshly distilled neutral dimethyl sulfate added dropwise, after which the product is stirred for another hour at 50–60° C. On cooling, the viscous melt solidifies to form a hard, waxlike mass of pale yellow color which is soluble in warm water.

*Example 16*

56 parts of cocoanut oil fatty acid and 55 parts of the highly methylated methylol melamine mentioned in Example 1 are fused together in a flask and heated to 195–200° C. in the course of 2 hours under an initial pressure of 10–50 mm., depending on the degree of foaming. The melt is stirred for two hours at this temperature and then allowed to cool to 120° C., and 23.5 parts of triethanolamine added. The reaction mass is then heated to 115–120° C. for an hour and a half at 10–15 mm. pressure. When the melt is stirred with 9 parts of glacial acetic acid at 80° C. there is obtained a redbrown, clear oil which is soluble in water.

*Example 17*

30 parts of piperidine acetate, 90 parts of a condensation product from methylated methylol melamine and N-methylol stearic acid amide, prepared as described in the second paragraph of Example 4, and 12 parts of dioxane are heated to 120° C. for 2 hours while stirring. The solvent is distilled off under reduced pressure to obtain a wax-like reaction product.

A test portion of the new condensation product is mixed with a little ethanol at a raised temperature. On addition of hot water it gives an opalescent solution which on addition of a little acetic acid becomes clear as water and foams very much when shaken. From the latter solution, sodium hydroxide precipitates the free base in the form of flakes which redissolve when acidified.

*Example 18*

66 parts of N-methylol stearic acid amide and 15 parts of triethanolamine are fused together at a pressure of 10–15 mm. and heated to 110° C. while stirring for 2 hours. The melt is then soluble in dilute acetic acid. It is mixed with 16 parts of dimethylol urea dimethyl ether and the mixture heated to 120° C. for one hour in vacuo.

The melt is then stirred with 6 parts of glacial acetic acid at 75–85° C. There is thus obtained a yellowish, wax-like, water-soluble product.

Instead of the dimethylol urea dimethyl ether there may be used an equivalent quantity of dimethylol urea.

*Example 19*

Cotton gabardine is treated on the foulard up to an increase in weight of about 100 percent, in an aqueous bath at a temperature of 60–65° C. which contains 9 parts of water, 0.1 part of ammonium chloride, 0.1 part of 85 percent formic acid and 0.8 part of the emulsion described below. The fabric is thereupon dried at 80° C. and subsequently after-treated for 5 minutes at 120–150° C. Both the unwashed and the washer fabric shows good water-repellent properties.

The emulsion used in this example can be produced as follows:

40 parts of the product obtainable according to Example 1 and 40 parts of paraffin wax are melted together at 90–95° C. Emulsification with brisk stirring is then carried out with the adition of 80 parts of water at 60–70° C. The emulsion is continuously stirred until the mass reaches room temperature.

*Example 20*

An operation is conducted in an analogous manner to that described in Example 19 but using a bath which contains 9 parts of water, 0.1 part of ammonium chloride, 0.1 part of 85 percent formic acid and 0.1–0.8 part of one of the condensation products obtainable according to Examples 1, 4, 6 or 8–12. In this manner a cotton gabardine is obtained which possesses a finish of good water-repellent properties which are still retained after a boiling wash with 5 grams per liter of soap and 2 grams per liter of sodium carbonate.

*Example 21*

Viscose artificial silk is treated for 30 minutes at 20–30° C. with a bath ratio of 1:30 in a bath which contains 0.1–1 percent of one of the condensation products obtainable according to Examples 1–15, 17 and 18 and 1–4 percent of ammonium chloride (both calculated upon the weight of yarn). Drying is then carried out at 80° C. and hardening at a somewhat higher temperature. A viscose artificial silk is obtained with a very good, soft handle which still remains after washing (¼ hour at 90° C. in a bath which contains 2 grams per liter of the disodium salt of 2-heptadecyl-N-benzyl-benzimidazole disulfonic acid and 1 gram per liter of 25 percent ammonia).

What we claim is:

1. A water soluble salt of a hardenable basic ternary condensation product which has been obtained by heating together first (a) about 1 mol of a hexamethylolmelamine hexamethyl ether with (b) about 2 mols of stearic acid and heating the ester thus obtained with (c) about 1 mol of triethanolamine and converting the base into the water soluble salt with acetic acid.

2. A water soluble salt of a hardenable basic ternary condensation product which has been obtained by heating together first (a) about 1 mol of a hexamethylolmelamine hexamethylether with (b) about 2 mols of stearic acid N-methylolamide and heating the ether thus obtained with (c) about 1 mol of triethanolamine and converting the base into the water soluble salt with acetic acid.

3. A water soluble salt of a hardenable basic ternary condensation product which has been obtained by heating together first (b) 2 mols of stearic acid with (c) 1 mol of diethylenetriamine and then heating 1 to 3 mols of this amide with (a) 1 mol of a hexamethylolmelaminehexamethylether and converting the base into the water soluble salt with acetic acid.

4. A water soluble quaternary ammonium salt of a hardenable basic ternary condensation product which has been obtained by heating together first (b) 1 mol of stearic acid N-methylolamide with (c) 1 mol of triethanolamine heating the amide thus obtained with (a) 1 mol of a hexamethylolmelamine-hexamethylether and this condensation product with another mol of N-methylolamide of stearic acid and converting the base into the quaternary ammonium salt with 1 mol of benzyl chloride.

5. A water soluble quaternary ammonium salt of a hardenable basic ternary condensation product which has been obtained by heating together first (b) 1 mol of stearic acid N-methylolamide with (c) 1 mol of triethanolamine at 110° C. during two hours in vacuo, heating the amide thus obtained with (a) 1 mol of a hexamethylolmelamine-hexamethylether at 120° C. for two hours in vacuo and heating this condensation product with another mol of stearic acid N-methylolamide until the product is soluble in dilute acetic acid and finally converting the base into the quaternary ammonium salt with 1 mol of benzylchloride at 85–105° C. at ordinary pressure.

6. A water-soluble salt of a hardenable basic ternary condensation product which has been obtained by heating together (a) a member selected from the group consisting of methylol compounds of aminotriazines, methylol compounds of urea, and ethers of the said methylol compounds with low-molecular aliphatic alcohols having at most 4 C-atoms, (b) an aliphatic compound which contains a carbon chain of at least 7 C-atoms selected from the group consisting of carboxylic acids, carboxylic acid-N-methylol-amides and N-methylol-urethanes, and (c) a member selected from the group consisting of water-soluble aliphatic low-molecular primary amines containing carbon chains of at most 4 C-atoms, water-soluble aliphatic low-molecular secondary amines containing carbon chains of at most 4 C-atoms and water-soluble salts of said amines with acids, and converting the product when obtained as base into the water-soluble salt.

References Cited in the file of this patent

UNITED STATES PATENTS

| | | |
|---|---|---|
| 2,214,851 | D'Alelio | Sept. 17, 1940 |
| 2,279,497 | Sallmann | Apr. 14, 1942 |
| 2,357,273 | Thurston | Aug. 29, 1944 |
| 2,374,259 | Albrecht | Apr. 24, 1945 |
| 2,420,157 | West | May 6, 1947 |
| 2,433,802 | West | Dec. 30, 1947 |
| 2,505,649 | Pikl | Apr. 25, 1950 |
| 2,509,174 | Scott | May 23, 1950 |
| 2,510,522 | Rust | June 6, 1950 |